(12) United States Patent
Chen et al.

(10) Patent No.: US 9,430,959 B2
(45) Date of Patent: Aug. 30, 2016

(54) CHARACTER REGION PIXEL IDENTIFICATION DEVICE AND METHOD THEREOF

(75) Inventors: Haifeng Chen, Ishikawa (JP); Masashi Nakao, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 34 days.

(21) Appl. No.: 14/126,330

(22) PCT Filed: Sep. 9, 2011

(86) PCT No.: PCT/JP2011/070573
§ 371 (c)(1),
(2), (4) Date: Dec. 13, 2013

(87) PCT Pub. No.: WO2012/172699
PCT Pub. Date: Dec. 20, 2012

(65) Prior Publication Data
US 2014/0118389 A1 May 1, 2014

(30) Foreign Application Priority Data
Jun. 14, 2011 (JP) .................................. 2011-131910

(51) Int. Cl.
*G09G 3/20* (2006.01)
*G06K 9/46* (2006.01)
*G06K 9/62* (2006.01)
(Continued)

(52) U.S. Cl.
CPC *G09G 3/20* (2013.01); *G06K 9/325* (2013.01); *G06K 9/38* (2013.01); *G06K 9/4642* (2013.01); *G06K 9/62* (2013.01); *G06K 2209/01* (2013.01)

(58) Field of Classification Search
None
See application file for complete search history.

(56) References Cited

U.S. PATENT DOCUMENTS

| 4,953,013 A | 8/1990 | Tsuji et al. |
| 5,119,185 A | 6/1992 | Ikeda et al. |
| 5,315,382 A | 5/1994 | Tanioka |

(Continued)

FOREIGN PATENT DOCUMENTS

| EP | 0898416 A2 | 2/1999 |
| JP | 2-294884 A | 12/1990 |

(Continued)

OTHER PUBLICATIONS

International Search Report dated Dec. 13, 2011, as issued in corresponding International Patent Application No. PCT/JP2011/070573, filed Sep. 9, 2011 (with English translation—2 pages).

(Continued)

*Primary Examiner* — Michael J Cobb
(74) *Attorney, Agent, or Firm* — Maier & Maier, PLLC

(57) ABSTRACT

An anti-aliasing font character on a monitor is prevented from being erroneously judged as an image region. The pixel of interest and four pixels each preceding and following the pixel of interest (a total of nine pixels) are extracted (S3). The largest of the values of the sub-pixels of each of the nine pixels extracted is determined as the representative value of each pixel (step S5). The nine representative values are represented as a histogram and referred to as H0, H1, H2, and the like in the descending order of the frequency in the distribution (S7). Whether Formula (1) below is satisfied is determined (S9). H0+H1+H2<TH . . . (1) If Formula (1) is satisfied, the pixel of interest is judged as a non-character-region pixel; if not, the pixel of interest is judged as a character-region pixel (S11, S13).

14 Claims, 6 Drawing Sheets

(51) Int. Cl.
*G06K 9/38* (2006.01)
*G06K 9/32* (2006.01)

(56) References Cited

U.S. PATENT DOCUMENTS

| | | | |
|---|---|---|---|
| 5,796,876 A * | 8/1998 | Wang | H04N 1/403 |
| | | | 382/270 |
| 6,473,202 B1 | 10/2002 | Kanata et al. | |
| 6,608,941 B1 * | 8/2003 | Suzuki | H04N 1/409 |
| | | | 358/3.01 |
| 2002/0136458 A1 * | 9/2002 | Nagasaka | G06K 9/3241 |
| | | | 382/209 |
| 2003/0095135 A1 * | 5/2003 | Kaasila | G06F 3/0481 |
| | | | 345/613 |
| 2003/0169442 A1 * | 9/2003 | Yokochi | H04N 1/56 |
| | | | 358/1.9 |
| 2004/0042659 A1 | 3/2004 | Guo et al. | |
| 2004/0076337 A1 * | 4/2004 | Nishida | G06K 9/38 |
| | | | 382/274 |
| 2006/0115153 A1 * | 6/2006 | Bhattacharjya | G06K 9/00456 |
| | | | 382/173 |
| 2007/0116360 A1 * | 5/2007 | Jung | G06K 9/3233 |
| | | | 382/176 |
| 2009/0002480 A1 | 1/2009 | Cutler | |
| 2009/0208126 A1 * | 8/2009 | Matsumoto | H04N 19/60 |
| | | | 382/244 |
| 2010/0054586 A1 * | 3/2010 | Yamazaki | G06K 9/342 |
| | | | 382/164 |
| 2010/0259676 A1 * | 10/2010 | Swan | G06K 9/3266 |
| | | | 348/468 |

FOREIGN PATENT DOCUMENTS

| | | |
|---|---|---|
| JP | 5-268518 A | 10/1993 |
| JP | 2003-264689 A | 9/2003 |
| JP | 2010-532953 A | 10/2010 |
| KR | 20050027557 A * | 3/2005 |

OTHER PUBLICATIONS

Extended European Search Report dated May 27, 2015, including the Supplementary European Search Report and the European Search Opinion, in connection with corresponding EP Application No. 11867581.8 (6 pages).

* cited by examiner

HARDWARE CONFIGURATION

Fig. 4

|  | P(1,0) | P(1,1) | P(1,2) | P(1,3) | P(1,4) |  |  |
|---|---|---|---|---|---|---|---|
| R:252 G:252 B:252 | R:109 G:159 B:207 | R:159 G:109 B:109 | R:252 G:252 B:207 | R:252 G:252 B:252 | R:252 G:252 B:207 | R:159 G:109 B:109 | R:109 G:159 B:207 | R:252 G:252 B:252 |

Fig. 5

| P(1,1) |  |  |  |  |  |  |  |  |  |  |
|---|---|---|---|---|---|---|---|---|---|---|
| 252 | 252 | 252 | 252 | 252 | 252 | 252 | 252 | 252 | 252 | 252 |
| 252 | 252 | 159 | 207 | 252 | 252 | 252 | 252 | 207 | 184 | 252 |
| 252 | 252 | 159 | 135 | 252 | 252 | 252 | 252 | 135 | 184 | 252 |
| 252 | 252 | 159 | 207 | 207 | 252 | 252 | 207 | 184 | 184 | 252 |
| 252 | 252 | 159 | 252 | 158 | 252 | 252 | 184 | 229 | 184 | 252 |
| 252 | 252 | 159 | 252 | 229 | 229 | 229 | 252 | 252 | 184 | 252 |
| 252 | 252 | 159 | 252 | 252 | 159 | 159 | 252 | 252 | 184 | 252 |
| 252 | 252 | 159 | 252 | 252 | 207 | 229 | 252 | 252 | 184 | 252 |
| 252 | 252 | 159 | 252 | 252 | 252 | 252 | 252 | 252 | 184 | 252 |
| 252 | 252 | 159 | 252 | 252 | 252 | 252 | 252 | 252 | 184 | 252 |
| 252 | 252 | 252 | 252 | 252 | 252 | 252 | 252 | 252 | 252 | 252 |

Fig. 6

LUMINANCE VALUES

P(1,1)

| 232 | 232 | 232 | 232 | 232 | 232 | 232 | 232 | 232 | 232 | 232 |
|-----|-----|-----|-----|-----|-----|-----|-----|-----|-----|-----|
| 232 | 228 | 122 | 144 | 232 | 232 | 232 | 232 | 160 | 130 | 227 |
| 232 | 228 | 125 | 132 | 203 | 232 | 232 | 214 | 118 | 130 | 227 |
| 203 | 228 | 127 | 189 | 144 | 232 | 232 | 160 | 168 | 137 | 227 |
| 186 | 228 | 127 | 216 | 127 | 221 | 214 | 137 | 208 | 137 | 227 |
| 186 | 228 | 127 | 221 | 181 | 166 | 181 | 186 | 214 | 137 | 227 |
| 186 | 228 | 127 | 221 | 228 | 122 | 115 | 221 | 214 | 137 | 227 |
| 203 | 228 | 127 | 221 | 232 | 232 | 232 | 232 | 214 | 137 | 227 |
| 232 | 228 | 127 | 221 | 232 | 232 | 232 | 232 | 214 | 137 | 227 |
| 232 | 228 | 127 | 221 | 232 | 232 | 232 | 232 | 214 | 137 | 227 |
| 232 | 232 | 232 | 232 | 232 | 232 | 232 | 232 | 232 | 232 | 232 |

| R:252 | R:252 | R:159 | R:109 | R:252 |       |
|-------|-------|-------|-------|-------|-------|
| G:252 | G:252 | G:109 | G:159 | G:252 | ----- |
| B:252 | B:207 | B:109 | B:207 | B:252 |       |

Fig. 8

CHARACTER REGION PIXEL IDENTIFICATION DEVICE AND METHOD THEREOF

RELATED APPLICATIONS

This application is the U.S. national stage application under 35 U.S.C. §371 of International Patent Application No.: PCT/JP2011/0705735, filed on Sep. 9, 2011, which claims priority under 35 U.S.C. §119, to Japanese Patent Application No.: 2011-131910, filed Jun. 14, 2011, the disclosures of which are incorporated herein by reference in their entireties.

TECHNICAL FIELD

The present invention relates to a method for distinguishing between a text region and a non-text region and in particular to font judgment involving an anti-aliasing process.

BACKGROUND ART

Nowadays, to improve viewability of images on the screen of a personal computer, an image region is subjected to highlighting. In such a highlighting process, in order to unhighlight a character region, it is necessary to judge whether the pixel of interest is a pixel included in a character.

The inventor performed judgment of a text region using the following method.

1) A histogram for y values of nine pixels, including the pixel of interest and eight pixels adjacent to the pixel of interest is prepared. 2) The total sum of the most frequent gray-level, the second most frequent gray-level, and the third most frequent gray-level are obtained. 3) The total sum is compared with a threshold. If the total sum is greater than or equal to the threshold, the region is judged as text; if the sum total is smaller than the threshold, the region is judged as non-text. 4) Based on the judgment result, a uniform average filter of 3 lines*5 pixels is superimposed to automatically adjust the intensity of image processing.

Patent Document 1 discloses an image processing device which can detect a thin line accurately and output a thinned image, such as a black character, with high quality.

PRIOR ART DOCUMENTS

Patent Documents

Patent Document 1: Japanese Unexamined Patent Application Publication No. 2003-264689

SUMMARY OF THE INVENTION

Problems to be Solved by the Invention

However, the above judgment method using the luminance value has difficulty in detecting a font involving an anti-aliasing process using sub-pixels (hereafter referred to as an anti-aliasing font). The reason is that an anti-aliasing font is judged as a non-text region by traditional judgment methods based on a y value because the R component, G component, and B component of a pixel included in a character edge are each subjected to a smoothing process.

The present invention has been made to solve the above problem, and an object thereof is to provide a method or device which can judge, as a character-region pixel, even a font involving an anti-aliasing process using sub-pixels.

Means for Solving the Problems (1) The present invention provides a method for judging whether a unit pixel is included in a character region on a display screen including a plurality of unit pixels, each unit pixel having three or more primary color sub-pixels arranged therein. The method includes: when a pixel of interest is specified, specifying the pixel of interest and a predetermined number of unit pixels adjacent to the pixel of interest, as a judgment region; determining the largest of values of the primary color sub-pixels of each of the unit pixels in the judgment region, as a representative value of the unit pixel; and based on the representative values of the unit pixels in the judgment region, judging whether the pixel of interest is included in a character region.

Thus, it is possible to judge, as a character-region pixel, even a font involving an anti-aliasing process using sub-pixels.

(2) The present invention provides a method for judging whether a unit pixel is included in a character region on a display screen including a plurality of unit pixels, each unit pixel having three or more primary color sub-pixels arranged therein. The method includes: when a pixel of interest is specified, specifying the pixel of interest and a predetermined number of unit pixels adjacent to the pixel of interest, as a judgment region; determining the smallest of values of the primary color sub-pixels of each of the unit pixels in the judgment region, as a representative value of the unit pixel; and based on the representative values of the unit pixels in the judgment region, judging whether the pixel of interest is included in a character region.

Thus, it is possible to judge, as a character-region pixel, even a font involving an anti-aliasing process using sub-pixels.

(3) The present invention provides a method for judging whether a unit pixel is included in a character region on a display screen including a plurality of unit pixels, each unit pixel having three or more primary color sub-pixels arranged in the same arrangement order therein. The method includes: obtaining a difference between a value of the last primary color sub-pixel in the arrangement order, of each of the unit pixels and a value of the first primary color sub-pixel in the arrangement order, of a subsequent unit pixel; and based on the obtained differences between the unit pixels, judging whether a unit pixel is included in a character region.

Thus, it is possible to judge, as a character-region pixel, even a font involving an anti-aliasing process using sub-pixels.

(4) In the method of the present invention, the character region is preferably judged by shifting the pixel of interest to another and repeating the specifying step, the determining step, and the judging step. Thus, it is possible to judge whether a pixel is included in a character region in a repetition range.

5. The present invention provides an apparatus for judging whether a unit pixel is included in a character region on a display screen including a plurality of unit pixels, each unit pixel having three or more primary color sub-pixels arranged therein. The apparatus includes: specification means configured to, when a pixel of interest is specified, specify the pixel of interest and a predetermined number of unit pixels adjacent to the pixel of interest, as a judgment region; determination means configured to determine the largest of values of the primary color sub-pixels of each of the unit pixels in the judgment region, as a representative value of the unit pixel; and judgment means configured to, based on the representative values of the unit pixels in the judgment region, judge whether the pixel of interest is included in a character region.

Thus, it is possible to judge, as a character-region pixel, even a font involving an anti-aliasing process using sub-pixels.

(6) The present invention provides an apparatus for judging whether a unit pixel is included in a character region on a display screen including a plurality of unit pixels, each unit pixel having three or more primary color sub-pixels arranged therein. The apparatus includes: specification means configured to, when a pixel of interest is specified, specify the pixel of interest and a predetermined number of unit pixels adjacent to the pixel of interest, as a judgment region; determination means configured to determine the smallest of values of the primary color sub-pixels of each of the unit pixels in the judgment region, as a representative value of the unit pixel; and judgment means configured to, based on the representative values of the unit pixels in the judgment region, judge whether the pixel of interest is included in a character region.

Thus, it is possible to judge, as a character-region pixel, even a font involving an anti-aliasing process using sub-pixels.

(7) The present invention provides an apparatus for judging whether a unit pixel is included in a character region on a display screen including a plurality of unit pixels, each unit pixel having three or more primary color sub-pixels arranged in the same arrangement order therein. The apparatus includes: difference calculation means configured to obtain a difference between a value of the last primary color sub-pixel in the arrangement order, of each of the unit pixels and a value of the first primary color sub-pixel in the arrangement order, of a subsequent unit pixel; and judgment means configured to, based on the obtained differences between the unit pixels, judge whether a unit pixel is included in a character region.

Thus, it is possible to judge, as a character-region pixel, even a font involving an anti-aliasing process using sub-pixels.

(14) The present invention provides a method for determining a representative value for judging whether a unit pixel is included in a character region on a display screen including a plurality of unit pixels, each unit pixel having three or more primary color sub-pixels arranged therein. The method includes: when a pixel of interest is specified, specifying the pixel of interest and a predetermined number of unit pixels adjacent to the pixel of interest, as a judgment region; and determining the largest or smallest value of values of the primary color sub-pixels of each of the unit pixels in the judgment region, as a representative value of the unit pixel.

Thus, it is possible to obtain the representative value of the unit pixel of interest for determining whether the unit pixel of interest is a unit pixel included in a character region.

Note that "primary color sub-pixels" in the present specification and RGB sub-pixels in an embodiment correspond to each other.

BRIEF DESCRIPTION OF THE DRAWINGS

Figure 4:
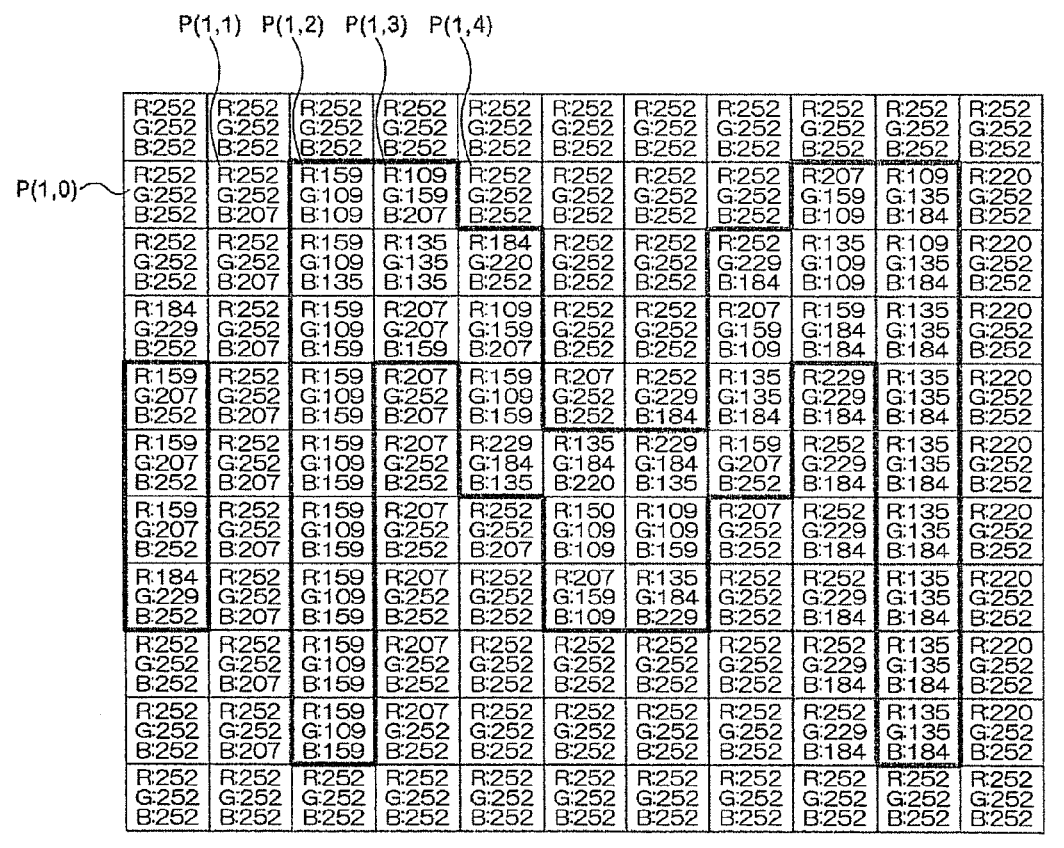

FIG. 4 is a diagram showing the RGB values of the sub-pixels of each pixel in an anti-aliasing font.

FIG. 5 is a diagram showing mirror-duplication at an edge.

FIG. 6 is a diagram showing the largest values of the pixels obtained from the RGB values of the sub-pixels.

FIG. 7 is a diagram showing the luminance values y of the pixels obtained from the RGB values of the sub-pixels.

FIG. 8 is a diagram showing a stripe direction.

EMBODIMENTS

An embodiment of the present invention will be described with reference to the drawings.

1.1 Function Blocks

Figure 1:
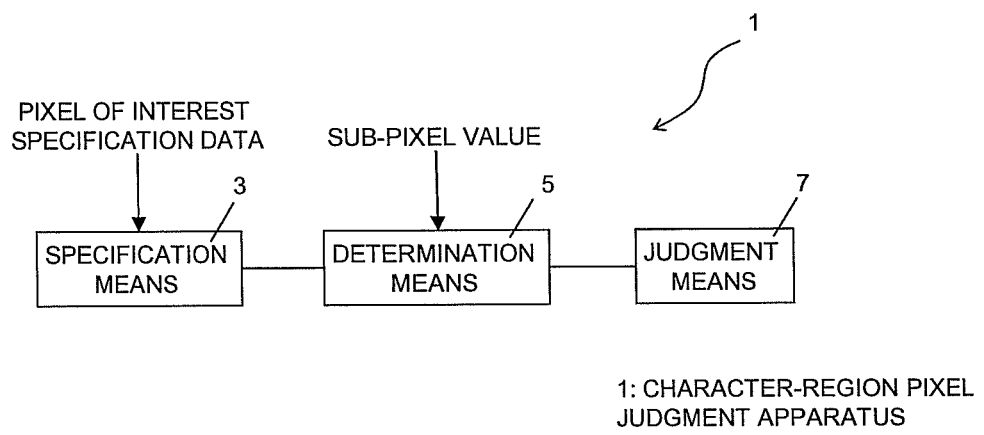
FIG. 1 is a block diagram of a character-region pixel judgment device 1.

FIG. 1 is a function block diagram showing a character-region pixel judgment device 1 of one embodiment of the present invention.

The character-region pixel judgment device 1 is a device that judges whether a unit pixel is included in a character region on the display screen including multiple unit pixels each including three or more primary color sub-pixels. The character-region pixel judgment device 1 includes specification means 3, determination means 5, and judgment means 7.

When the unit pixel of interest is specified, the specification means 3 specifies the unit pixel of interest and a predetermined number of unit pixels adjacent to the unit pixel of interest, as a judgment region. The determination means 5 determines the largest of the values of the primary color sub-pixels of each unit pixel included in the judgment region, as the representative pixel value of the unit pixel. Based on the representative values of the unit pixels in the judgment region, the judgment means 7 judges whether the unit pixel of interest is included in a character region.

1.2 Hardware Configuration

Figure 2:
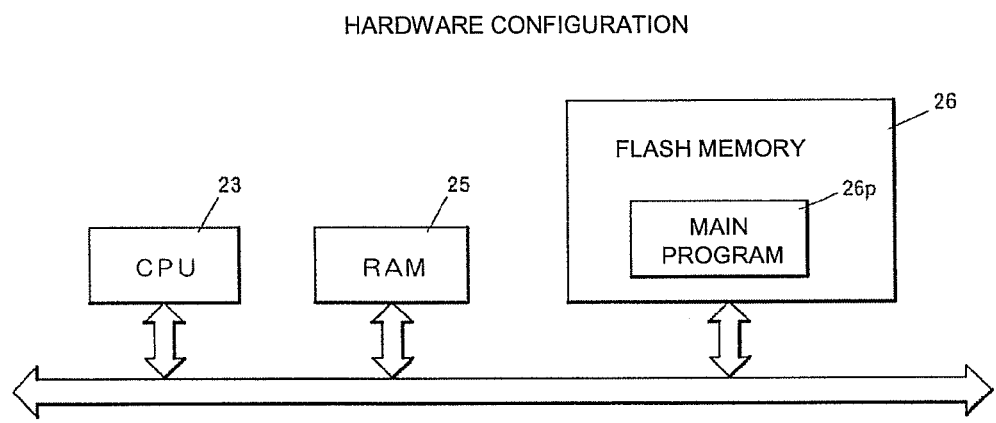
FIG. 2 is a diagram showing an example hardware configuration of the character-region pixel judgment device 1 including a CPU.

FIG. 2 shows the hardware configuration of the character-region pixel judgment device 1. The character-region pixel judgment device 1 includes a CPU 23, a RAM 25, and a flash memory 26. The flash memory 26 is storing a program 26p. The program 26p performs a character-region pixel judgment process, as will be described later. The RAM 25 is storing a calculation result or the like. Image data of one screen is stored.

In accordance with the program 26p, the CPU 23 sets a window of 1*9 pixels to the image data stored in the memory 27, judges whether the set region includes a character region, and stores the judgment result in the RAM 25.

1.3 Description of Flowchart

A process performed by the program 26p shown in FIG. 2 will be described with reference to FIG. 3. Hereafter, as shown in FIG. 4, there will be described an example in which the pixel of interest i is pixel (1,0) and is then shifted to pixel (1,1), pixel (1,2), and the like. Note that FIG. 4 is an enlarged view of a portion where a character "M" is written in an anti-aliasing font.

When the pixel of interest number i is (1,0) (Step 1), the CPU 23 extracts the pixel of interest, (1,0), and four pixels each preceding and following the pixel of interest (a total of nine pixels) (step S3). As for the edge, it is assumed in the present embodiment that four pixels on the right of the pixel of interest are mirror-duplicated and the mirror-duplicated four pixels exist on the left of the pixel of interest. Specifically, duplications are made so that pixel (1,1), pixel (1,2), pixel (1,3), and pixel (1,4) sequentially exist on the left of pixel (1,0). FIG. 5 shows the configuration of the total of nine pixels. Thus, the same pixels are virtually disposed on the right and left of pixel (1,0).

Figure 3:
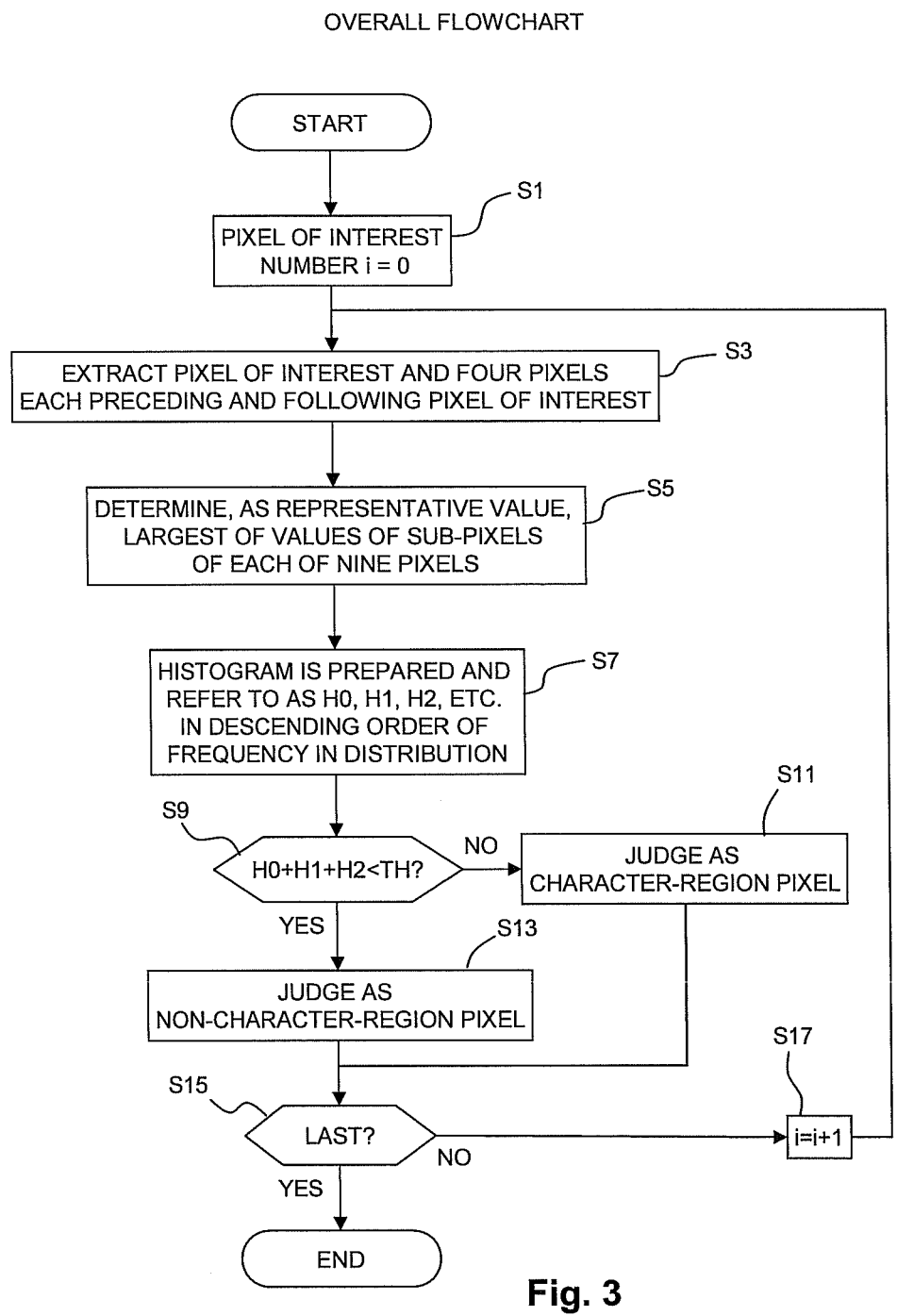
FIG. 3 is an overall flowchart.

The CPU 23 determines the largest of the values of the sub-pixels of each of the nine pixels, as the representative value of each pixel (step S5 in FIG. 3). In this case, the CPU 23 extracts "252", "207", "159", "252", "252", "252", "159", "207", and "252" as the representative values of the nine pixels.

The CPU 23 represents the nine representative values as a histogram and refers to the representative values as H0, H1, H2, and the like in the descending order of the frequency in the distribution (step S7). In this case, H0 of the representative value "252"=5; H1 of the representative value "207"=2; and H2 of the representative value "159"=2.

The CPU 23 determines whether Formula (1) below is satisfied (step S9).

$$H0+H1+H2<TH \quad (1)$$

If Formula (1) is satisfied in step S9, the CPU 23 judges the pixel of interest as a non-character-region pixel (step S13); if not, it judges the pixel of interest as a character-region pixel (step S11). In this case, H0=5; H1=2; and H2=2. It is assumed in the present embodiment that TH=6. Accordingly, Formula (1) is not satisfied, and the CPU 23 judges the pixel of interest number (1,0) as a character-region pixel.

Next, the CPU 23 judges whether the current pixel of interest i is the last one (step S15 in FIG. 3). In this case, the current pixel of interest i is not the last one. Accordingly, the CPU 23 increments the pixel of interest i (step S17).

Thus, the pixel of interest number i becomes (1,1), and the CPU 23 extracts the pixel of interest (1,1) and four pixels each preceding and following pixel (1, 1) (a total of nine pixels) (step S3). The CPU 23 determines the largest of the values of the sub-pixels of each of the nine pixels, as the representative value of each pixel (step S5). In this case, the CPU 23 extracts "207", "159", "252", "252", "252", "159", "207", "252", and "252" as the representative values of the nine pixels.

The CPU 23 represents the nine representative values as a histogram and refers to the representative values as H0, H1, H2, and the like in the descending order of the frequency in the distribution (step S7 in FIG. 3). In this case, H0 of the representative value "252"=5; H1 of the representative value "207"=2; and H2 of the representative value "159"=2.

If Formula (1) is satisfied, the CPU 23 judges the pixel of interest as a non-character-region pixel; if not, it judges the pixel of interest as a character-region pixel (steps S9, S11, S13).

In this case, H0=5; H1=2; and H2=1. It is assumed in the present embodiment that TH=6. Accordingly, Formula (1) is not satisfied, and the CPU 23 judges the pixel of interest number (1,1) as a character-region pixel.

Similarly, the CPU 23 sequentially judges whether the pixel of interest is a character-region pixel.

Note that in the present embodiment, mirror-duplications are also made at the right edge, as at the left edge.

After the last pixel is handled in step S15 of FIG. 3, the process is complete.

That is, in the present embodiment, whether the pixel of interest is a character-region pixel is judged by using the largest value of each unit pixel as shown in FIG. 6 as the representative value of the pixel. For comparison, FIG. 7 shows luminance values obtained by converting the RGB values of FIG. 4. For example, luminance values "232," "228," "122," "144," "232," and the like are arranged in this order, starting with that of the pixel of interest (1,0). As seen, the values have wide varieties. Accordingly, if whether the pixel of interest is a character-region pixel is judged based on the luminance values, Formula (1) above is satisfied. As a result, the pixel of interest is judged as a non-character-region pixel, although it is actually a character-region pixel. On the other hand, if the largest of the values of the primary color sub-pixels is used, unit pixels having the same value exist around the pixel of interest. Accordingly, even an anti-aliasing font is not erroneously judged as an image region. For an image, such regularity is not found in the largest values of the primary color sub-pixels. For this reason, the pixel of interest is not erroneously judged as a character-region pixel.

As described above, for an anti-aliasing font, the values of the primary color sub-pixels (RGB values) tend to be common to adjacent pixels. Accordingly, pixels included in a character region show peculiar deviation in a histogram, unlike a no-character region. For this reason, in the present embodiment, the largest or smallest of the RGB values of the sub-pixels is determined as the representative value of each unit pixel, and whether the pixel of interest is a character-region pixel is judged based on the representative values. Thus, it is possible to judge even an anti-aliasing font, which is formed by multiple character colors due to smoothing processing of character edges, as a pixel included in a character region.

While whether each unit pixel is a pixel included in a text region is judged in the present embodiment, traditional weighting using a uniform average filter may be additionally performed. For example, weighting using a uniform average filter is performed as follows. That is, a text possibility t is calculated using a ⅗ uniform average filter; and by using the text possibility t as a weight Wt, the coefficient of an emphasis filter is changed. In this case, the weight Wt may be equal to the text possibility t or calculated using a formula below.

Wt=k+(1−k)*t where 0≤k<1 and 0≤t≤1. By performing such weighing using a uniform average filter, it is possible to judge a text area possibility on the basis of the text detection results of adjacent pixels. That is, it is possible to exclude a pixel which is isolatedly regarded as text.

In the present embodiment, it is possible to detect an anti-aliasing font, such as PDF or ClearType, which has not been easily detected by traditional methods, thereby improving the text detection accuracy.

2. Other Embodiments

In the above embodiment, the largest value is obtained as the representative value of each pixel in the judgment region. Alternatively, the smallest value may be used. For an anti-aliasing font, the smallest of the values of the primary color sub-pixels (RGB values) also tends to be common among adjacent pixels. Accordingly, use of the smallest value also allows judgment of whether the pixel of interest is a pixel included in a character region.

The following method may be used to judge whether the pixel of interest is a pixel included in a character region.

In a liquid crystal display, multiple primary color pixels forming each unit pixel are arranged in a matrix form. For example, in three-color (RGB) stripes, each unit pixel includes RGB. Accordingly, the primary color pixels are arranged in the order of RGBRGBRGB and the like. An anti-aliasing font is characterized in that the value of the last primary color sub-pixel in the above arrangement order, of one unit pixel and the value of the first primary color sub-pixel in the arrangement order, of a subsequent unit pixel are close to each other. Accordingly, by obtaining the difference between both pixels sequentially in the arrangement order, it is possible to judge whether a pixel is included in a character region of the anti-aliasing font or in an image region.

For example, the values of the primary color sub-pixels of unit pixels (1,1) to (1,4) arranged in FIG. 4 are shown in FIG. 8. In FIG. 8, the value of the last primary color sub-pixel B of unit pixel (1,1) is "207"; the value of the first primary color sub-pixel R of the subsequent unit pixel, (1,2), in the arrangement order is "159"; and the difference is "48". By obtaining such a difference sequentially in the array order, the differences between the respective adjacent unit pixels are obtained.

If these differences are smaller than a predetermined threshold, the unit pixels are judged as character-region pixels. The reason is that the differences between the respective adjacent sub-pixels tend to be the same value. To perform such detection, the above histogram-type detector may be used.

While R, G, and B are used as primary color sub-pixels in the present embodiment, other primary colors, C, M, Y, or the like, may be used.

In addition to the three primary colors, one or more other primary colors may be used.

In the present embodiment, whether the pixel of interest is a unit pixel included in a character region is judged based on the correlation between the representative values of the unit pixels. Specifically, judgment as to whether the pixel of interest is a character-region pixel is made based on whether the total sum of the first to third largest ones of the representative values of the adjacent nine pixels exceeds the threshold. However, the method for performing judgment of a character region may be other methods than what is described above.

In the present embodiment, the largest value is obtained as the representative value of each pixel in the judgment region. The representative value may be obtained at any time as long as it exists when necessary.

While the number or shape of the adjacent unit pixels, including the unit pixel of interest, is 1*9 in the present embodiment, such a number or shape may be, e.g., 3*3. Further, the number or shape of the constituent pixels is not limited to any particular one.

It is also possible to form a monitor or set-top box including the character-region pixel judgment device of the present embodiment. Such a set-top box may be formed as a switching hub for switching the input data destination monitor to another.

In the present embodiment, the functions shown in FIG. 1 are achieved by using the CPU 23 and executing software. Alternatively, some or all of the functions may be achieved by using hardware, such as a logic circuit. Further, part of the program may be executed by the operating system (OS).

DESCRIPTION OF NUMERALS

23 CPU
25 RAM
26 flash memory

The invention claimed is:

1. A method for judging whether a unit pixel is included in a character region on a display screen including a plurality of unit pixels, each unit pixel having three or more primary color sub-pixels arranged therein, the method comprising:
   specifying, with a processor, a pixel of interest;
   when the pixel of interest is specified, automatically specifying, with a processor, the pixel of interest and a predetermined number of unit pixels adjacent to the pixel of interest, as a judgment region, wherein the predetermined number of unit pixels is a positive integer greater than 0;
   automatically determining, with the processor, the largest of values of the primary color sub-pixels of each of the unit pixels in the judgment region, as a respective representative value of the respective unit pixel; and
   based on a subset of a histogram of the representative values of the unit pixels in the judgment region being greater than a threshold value, automatically determining, with the processor, that the pixel of interest is included in a character region.

2. The method of claim 1, wherein:
   the judgment of the character region is performed by shifting the pixel of interest to another and repeating the specifying step, the determining step, and the judging step.

3. A method for judging whether a unit pixel is included in a character region on a display screen including a plurality of unit pixels, each unit pixel having three or more primary color sub-pixels arranged therein, the method comprising:
   specifying, with a processor, a pixel of interest;
   when the pixel of interest is specified, automatically specifying, with a processor, the pixel of interest and a predetermined number of unit pixels adjacent to the pixel of interest, as a judgment region, wherein the predetermined number of unit pixels is a positive integer greater than 0;
   automatically determining, with the processor, the smallest of values of the primary color sub-pixels of each of the unit pixels in the judgment region, as a respective representative value of the respective unit pixel; and
   based on a subset of a histogram of the representative values of the unit pixels in the judgment region being greater than a threshold value, automatically determining, with the processor, that the pixel of interest is included in a character region.

4. The method of claim 3, wherein:
   the judgment of the character region is performed by shifting the pixel of interest to another and repeating the specifying step, the determining step, and the judging step.

5. An apparatus for judging whether a unit pixel is included in a character region on a display screen including a plurality of unit pixels, each unit pixel having three or more primary color sub-pixels arranged therein, the apparatus comprising a processor and a memory, the processor being configured to:
   specify a pixel of interest;
   when the pixel of interest is specified, automatically specify the pixel of interest and a predetermined number of unit pixels adjacent to the pixel of interest, as a judgment region, wherein the predetermined number of unit pixels is a positive integer greater than 0;
   automatically determine the largest of values of the primary color sub-pixels of each of the unit pixels in the judgment region, as a respective representative value of the respective unit pixel; and
   based on a subset of a histogram of the representative values of the unit pixels in the judgment region being greater than a threshold value, automatically determine that the pixel of interest is included in a character region.

6. A monitor comprising the apparatus of claim 5.

7. A set-top box comprising the apparatus of claim 5.

8. The set-top box of claim 7, wherein:
   the set-top box is a switching hub for switching an input data destination monitor to another.

9. An apparatus for judging whether a unit pixel is included in a character region on a display screen including a plurality of unit pixels, each unit pixel having three or more primary color sub-pixels arranged therein, the apparatus comprising a processor and a memory, the processor being configured to:
   specify a pixel of interest;
   when the pixel of interest is specified, automatically specify the pixel of interest and a predetermined number of unit pixels adjacent to the pixel of interest, as a judgment region, wherein the predetermined number of unit pixels is a positive integer greater than 0;

automatically determine the smallest of values of the primary color sub-pixels of each of the unit pixels in the judgment region, as a respective representative value of the respective unit pixel; and based on a subset of a histogram of the representative values of the unit pixels in the judgment region being greater than a threshold value, automatically determine that the pixel of interest is included in a character region.

10. A monitor comprising the apparatus of claim 9.

11. A set-top box comprising the apparatus of claim 9.

12. The set-top box of claim 11, wherein:
the set-top box is a switching hub for switching an input data destination monitor to another.

13. A non-transitory computer readable medium storing a program for causing a computer to perform a character-region pixel judgment process of judging whether a unit pixel is included in a character region on a display screen including a plurality of unit pixels, each unit pixel having three or more primary color sub-pixels arranged therein, the program causing the computer to:

specify a pixel of interest;

when the pixel of interest is specified, automatically specify the pixel of interest and a predetermined number of unit pixels adjacent to the pixel of interest, as a judgment region, wherein the predetermined number of unit pixels is a positive integer greater than 0;

automatically determine the largest of values of the primary color sub-pixels of each of the unit pixels in the judgment region, as a respective representative value of the respective unit pixel; and based on a subset of a histogram of the representative values of the unit pixels in the judgment region being greater than a threshold value, automatically determine that the pixel of interest is included in a character region.

14. A non-transitory computer readable medium storing a program for causing a computer to perform a character-region pixel judgment process of judging whether a unit pixel is included in a character region on a display screen including a plurality of unit pixels, each unit pixel having three or more primary color sub-pixels arranged therein, the program causing the computer to:

specify a pixel of interest;

when the pixel of interest is specified, automatically specify the pixel of interest and a predetermined number of unit pixels adjacent to the pixel of interest, as a judgment region, wherein the predetermined number of unit pixels is a positive integer greater than 0;

automatically determine the smallest of values of the primary color sub-pixels of each of the unit pixels in the judgment region, as a respective representative value of the respective unit pixel; and based on a subset of a histogram of the representative values of the unit pixels in the judgment region being greater than a threshold value, automatically determine that the pixel of interest is included in a character region.

* * * * *